United States Patent

[11] 3,626,342

| [72] | Inventor | Robert H. Green<br>Grove City, Ohio |
|---|---|---|
| [21] | Appl. No. | 55,522 |
| [22] | Filed | July 16, 1970 |
| [45] | Patented | Dec. 7, 1971 |
| [73] | Assignee | Abex Corporation<br>New York, N.Y. |

[54] RELIEF VALVE STRUCTURE FOR OIL BATH SOLENOID
15 Claims, 4 Drawing Figs.

[52] U.S. Cl. ................................................. 335/257,
335/260, 251/129
[51] Int. Cl. ........................................................ H01f 7/08
[50] Field of Search ........................................... 335/255,
260, 257, 277, 258; 251/129, 138, 142

[56] References Cited
UNITED STATES PATENTS
| 2,975,340 | 3/1961 | Jencks et al. ................. | 335/257 X |
| 3,181,040 | 4/1965 | Viale et al. .................... | 251/129 X |

*Primary Examiner*—G. Harris
*Attorney*—Wood, Herron & Evans

ABSTRACT: An oil bath solenoid which has a relief valve mounted in the housing. The valve is so positioned in the housing and so structured that it functions (a) as a relief valve to relieve excessive oil pressure within the solenoid housing, (b) as a bumper for the solenoid's plunger when the plunger is moved to the deenergized position, and (c) as a reset device for manually positioning the plunger in the energized position if a power failure is experienced.

PATENTED DEC 7 1971
3,626,342
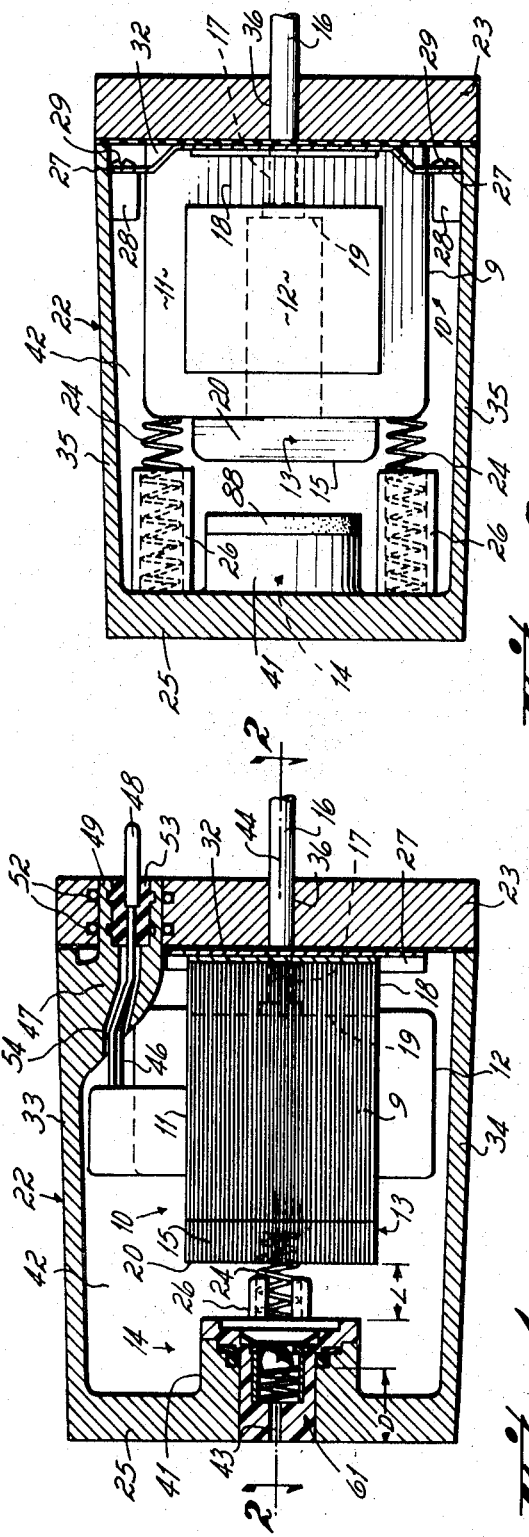
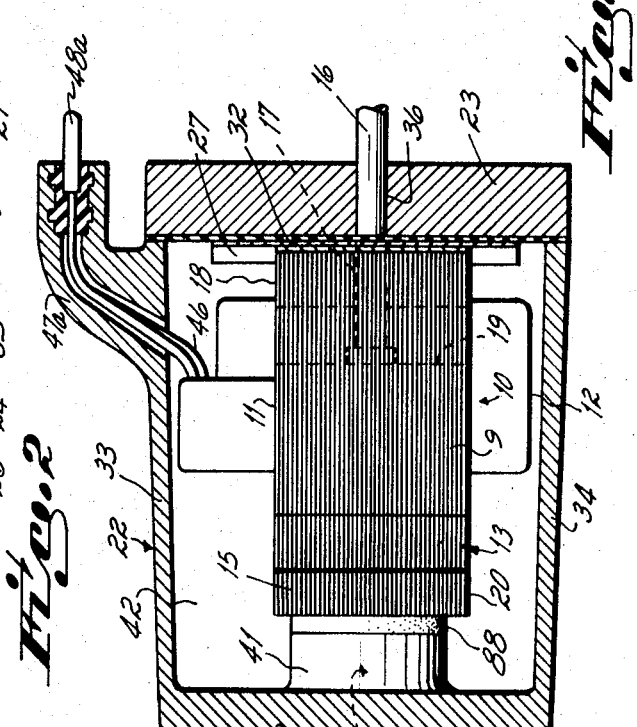
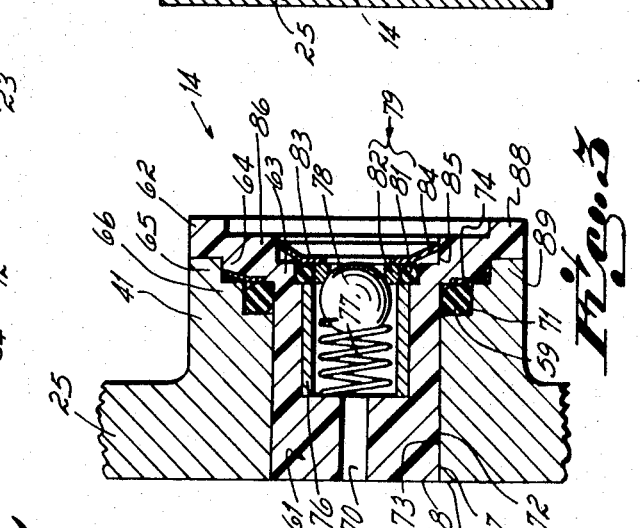
INVENTOR.
Robert H. Green
BY
Wood, Herron & Evans
ATTORNEYS

RELIEF VALVE STRUCTURE FOR OIL BATH SOLENOID

This invention relates to solenoids and, more particularly, this invention relates to an oil bath solenoid having a novel relief valve structure.

An electric solenoid is generally comprised of a coil of insulated wire which, when electrically energized, produces a magnetic field at the center of the coil. The magnetic field produced by the coil is used to magnetize a plunger or armature that passes through the center of the coil. Such magnetization causes a mechanical force to be exerted on the plunger. The solenoid is usually also provided with an iron or steel casing or frame which serves to increase the mechanical force exerted on the plunger by the magnetic field, and which also serves to constrain the magnetic field about the plunger.

Magnetization of the plunger serves to move the plunger to a predetermined location relative to the coil and, thereby, locate the plunger at a home or energized position relative to the coil, whenever the coil is electrically energized. When the coil is deenergized, i.e., when the magnetic field is removed, no mechanical force is exerted on the plunger to move it to the home or energized position and, therefore, the plunger may be moved to an away position through use of another or outside mechanical force.

In an effort to increase the operational life of electric solenoids it has been found that a substantially increased cycling life can be achieved at a reasonable cost by operating the solenoid in an oil bath. Operating a solenoid in an oil bath has a number of advantages. For example, the oil acts as a lubricant and, thereby, greatly reduces wear on the moving parts of the solenoid. Further, the oil bath substantially reduces shading coil failure because impact shocks during operation are substantially reduced. Further, and importantly, the oil acts as a heat transfer medium and, thereby, conducts heat from the solenoid to an enclosure or housing which surrounds same (oil conducts heat about three to five times faster than air). The housing provides a substantially increased surface area over the area of the coil itself, thereby permitting the heat generated by operation of the solenoid to be more efficiently dissipated. This, in turn, greatly increases the service load range over which the solenoid is useful.

However, in oil bath solenoids there must be provided a relief valve by which excessive pressure of the oil inside the housing can be relieved. Oil pressure buildup usually occurs because of the heat generated within the housing during use of the solenoid. As such, a relief valve in combination with an oil bath solenoid is known to the prior art.

Further, and as mentioned, the plunger of the solenoid is adapted to move between a home position and an away position depending on whether or not the coil of the solenoid is electrically energized. When the coil is not electrically energized the T-shaped plunger may be pushed or reciprocated to the away position where the head of the plunger abuts a stop, i.e., the stop automatically locates the plunger at the away position time after time. As such, a plunger stop in combination with an oil bath solenoid is also known to the prior art. But such stops are necessarily quite rigid to withstand repeated strikes and wear by the plunger; this causes undesirable impact shocks which, over a prolonged period of use, adversely affect the operation of the solenoid.

Further, and when the T-shaped plunger is in the away position, it may on occasion become useful to manually reposition the plunger into its home position if the solenoid is exposed to an electric power failure. In this connection, there is also known to the prior art a reset device that is operable from outside the housing by which the solenoid's plunger can be repositioned manually in the energized or home position when a power failure has occurred.

In any event, and in accordance with the prior art, in order to provide a relief valve to relieve excess oil pressure, a stop to locate automatically the plunger at the away position, and a reset device to locate manually the plunger at the home position, the oil bath solenoid structures have each necessarily required a separate device or structural piece to provide each of these three functions.

Thus, it has been one objective of this invention to provide an oil bath solenoid having a pressure relief valve structure, which structure functions as a relief valve for the oil bath and which also functions as at least one of a bumper or stop for the plunger and a manual reset device for the plunger.

It has been another objective of this invention to provide an oil bath solenoid having a relief valve structure, which structure is adapted to perform three functions, namely, to act as a relief valve for the oil bath, to act as a bumper or stop for the plunger, and to act as a manual reset device for the plunger.

In accordance with these objectives there has been provided, in preferred form, a relief valve structure that comprises a cup that is slidably carried in a hole in the solenoid's housing, the cup opening onto the inside of the solenoid's housing. The hole and, hence, the cup, is in alignment with the solenoid's plunger such that the plunger will overlie the hole when it moves to the away position. The cup is provided with an outwardly flaring flange at its lip, the flange being formed of a resilient material and being seated against the inner surface of the solenoid's housing when the relief valve is in normal operating position. A check valve is located within the cup, and a vent port is formed in the bottom of the cup.

In operation, and as the pressure of the oil bath exceeds a desirable level inside the solenoid's housing, oil can escape from inside the solenoid's housing through the check valve and vent hole to the atmosphere; thus, the structure functions as a relief valve for the oil bath. Further, and because the flange is aligned with the solenoid's plunger, as the head of the plunger is projected toward that wall of the solenoid's housing in which the relief valve structure is mounted, i.e., toward its away position, it can abut or strike the flange to locate it in the away position; thus the structure also functions as a stop or bumper. Further, and because the cup is slidably mounted in the wall of the solenoid's housing as well as aligned with the solenoid's plunger, it can be manually depressed inwardly to reposition the plunger toward its home position if a power failure occurs; thus, the structure further serves as a manual reset device.

Other objectives and advantages of the invention will be more apparent from the following detailed description taken in conjunction with the drawings in which:

FIG. 1 is a cross-sectional side view of the relief valve structure in combination with an oil bath solenoid in accordance with the principles of this invention;

FIG. 2 is a cross-sectional view taken along line 2—2 of FIG. 1;

FIG. 3 is an enlarged cross-sectional view of the relief valve structure only and taken along the same plane as the view of FIG. 1; and FIG. 4 is a cross-sectional view similar to FIG. 1 but illustrating the electric lead fitting as exterior to the housing instead of interior to the housing as shown in FIG. 1.

As illustrated in FIGS. 1 and 2, the oil bath solenoid 10 of this invention includes a frame 11, as viewed from the top, which is comprised of a stack of steel sheets 9. The frame 11 embraces a compact wire coil 12 which is fixed in position relative to the frame 11. A T-shaped plunger 13 is adapted to reciprocate into the coil 12 to a home position (see FIG. 1) against frame 11 when the coil is electrically energized, and to be reciprocated out of the coil to an away position (see FIG. 4) against relief valve structure 14 when the coil is not electrically energized. Note that the plunger 13 is of the same thickness as the frame 11, and is also made up of a stack of steel sheets 15. A plunger pin 16 is slidably received in hole 17 formed in the center of frame's section 18, the pin being adapted to abut bottom face 19 of plunger 13.

The solenoid 10 is located in a housing 22. The frame 11 is urged toward end cap or base cap 23 by compression springs 24 which bear against rear wall 25 of the housing 22. The springs 24 are received in sleeves 26 molded integral with the housing's rear wall 25. Clips 27 fixed to housing ribs 28 by screws 29 cooperate with slots on face 32 of frame 11 to locate the frame relative to end cap 23. The end cap 23 is fixed in sealing relation with the top 33, bottom 34 and side 35 walls of the housing 22 by bolts, not shown. Further, end cap 23 is provided with a port 36 for plunger pin 16, pin 16 also being slidably received in port 36. Plunger pin 16 is, of course, connected with that device or machine with which the solenoid is operatively connected.

The housing chamber 42 is provided with an oil bath, e.g., mineral oil, which substantially fills the housing chamber 42 during operation of the solenoid 10. Thus, all parts of the solenoid 10 are immersed within the oil bath.

The coil 12 is provided with a lead fitting for lead wires 46 of coil 12 which extend from the housing chamber 42, this fitting being an electrical jack 47 formed integral with the top wall 33, see FIG. 1. The jack 47 is directed into the interior of the housing 22 and is provided with a nose portion 49 which extends into the end cap 23. When assembled with the end cap 23 the nose portion 49 is surrounded by O-rings received in grooves 52 milled in the end cap, thereby providing a tight seal which is required because of the oil bath within the housing chamber 42. The lead wires 47 are each connected to one of a pair of suitable electric prongs or couplers 48 so the solenoid 10 can be connected in an electrical circuit. The couplers 48 are carried in a seal 53 received in the nose portion 49 of the jack 47 to prevent the oil bath from leaking out of the housing chamber 42 through lead wire conduit 54 to the atmosphere.

An alternative embodiment of the lead fitting is illustrated in FIG. 4; in this instance the jack 47a is directed outwardly of the housing 22 instead of into the housing chamber 42 as shown in FIG. 1. Except for the locations of the electrical jack 47a and couplers 48a outside or spaced from the base cap, the construction of the embodiment illustrated in FIG. 4 is essentially the same as the construction of FIG. 1.

It will be noted that the inner surface of the rear wall 25 is provided with a sleeve or cylindrical wall 41 that extends inwardly toward the center of the housing chamber 42. The axis 43 of the tubular wall 41 is coaxial with the axis 44 of the T-shaped plunger 13 for purposes which will become subsequently apparent. This tubular wall 41 defines a hole 67 in rear wall 25, the hole being located in the rear wall such that the head 20 of plunger 13 will overlie the hole when the plunger moves to the away position. The relief valve structure 14 of this invention is slidably carried in the inwardly directed sleeve 41.

The relief valve structure 14 includes a cup 61 having a flange 62 molded integral with its lip 63 and directed radially outward therefrom, the cup and flange constituting the housing of the relief valve structure. A port 70 is provided in the bottom of the cup 61. The underside of the flange 62 is of a stepped configuration, as at 64, and is adapted to seat in an identically configured stepped seat 65 formed in the lip 66 of the wall 41. The outside diameter of cup 61, and the stepped flange 62 dimensions relative to the stepped seat 65 dimensions, are such as to allow the housing 61, to slide relative to the hole 67 in rear wall 25 as defined by the sleeve or wall 41. Further, the depth of the cup 61 is sufficient such that the bottom face 68 thereof is substantially flush with the outer face 69 of the rear wall 25 when the structure 14 is assembled therewith in normal operating circumstances as shown in FIG. 1. An O-ring 59 is provided in a groove 71 in the wall 41 to assure an oil tight seal between the outside 72 of the cup 61 and the inside 73 of wall 41. A lock ring 74 is carried in a portion of stepped seat 65 to hold the O-ring 59 in seated relation within the groove 71 under certain operating circumstances as will be subsequently explained.

A sleeve 76 is carried within the cup 61, and inside the sleeve there is positioned a compression spring 77 and a steel ball 78, the compression spring resting against base 68 of the cup. The steel ball 78 and compression spring 77 are maintained in the attitude illustrated in FIG. 3 by a sealing ring 79 comprised of a rubber exterior periphery 81 and a steel 82 inner periphery. The steel inner periphery 82 provides a seat for the ball 78. The sealing ring 79, ball 78, compression spring 77 and sleeve 76 are maintained in seated relation within the cup 61 by means of a retainer ring 83, thereby providing a check valve which can open to relieve excess oil pressure from inside the housing chamber 42. The edges 84 of the retainer ring 83 dig or bite into a circular seat 85 provided in the intermediate surface 86 of the flange 62.

It will be particularly noted from FIG. 3 that the flange 62 includes an annular portion 88 which extends out beyond the retainer ring 83 and check valve, and which is located or seated on the outermost edge 89 of the cylindrical wall 41. Preferably both the cup 61 and flange 62, but at least the flange 62, is fabricated of a resilient material such as a commercial grade of 6–10 nylon. This ringlike portion 88 of flange 62 acts as a stop or bumper for the solenoid's plunger 13 as will be explained below. In operation, when the T-shaped plunger 13 is moved toward the left (which occurs when the coil 12 is deenergized), the head 20 of the plunger abuts against the annular bumper surface 88 of resilient material, thereby permitting the relief valve structure 14 to function as a bumper or stop for the solenoid—s plunger 13. The ringlike portion 88 of flange 62 is adequately buttressed or supported on its bottom face against the impact forces exerted by virtue of portion 88 resting on lip 89 of wall 41. Also, and because the bumper 88 is resilient, a large portion of the impact shock of the plunger 13 is absorbed when the plunger abuts or impacts against the relief valve structure, thereby increasing the service life of the solenoid.

Further, and when the pressure of the oil bath overcomes the pressure exerted by spring 77 on ball 78, the check valve opens in relief fashion to permit escape of excess oil through vent port 70 in the bottom of the cup 61. Thus, the check valve permits the relief valve structure 14 to function as a relief valve of the oil bath inside the housing chamber 42.

Further, when electric power to the solenoid's coil 12 has been cut off due to, e.g., a power failure, and when it is desired to move the T-shaped plunger 13 into the home position as illustrated in FIG. 1, an operator need merely depress manually the cup 61 inwardly into the housing chamber 42. Annular bumper surface 88 will abut the plunger head 20 as the cup 61 is pushed inwardly and, thereby, will move the plunger 13 into home position relative to the coil 12. The cup 61, as well as those check valve parts carried within it, is able to move axially toward the right as illustrated in the figures because of the slip-fit relation of the cup 61 with the hole 67 in the rear wall 25. The depth D of tubular wall 41 is preferably greater than the distance L between the bumper surface 88 of cup 61 and the end surface of plunger head 20 so that the relief valve structure is not pushed into the housing chamber 42 and out of engagement with wall 25 when it is used manually to reposition the plunger 13 in home position. The cup 61 and, hence, relief valve structure 14, stay in the outwardly extended position after manually resetting the plunger until some external force acts on the pin 16 to move it and the plunger 13 inwardly to its deenergized or away position. As the plunger 13 moves inwardly it pushed the structure 14 back into its normal operating attitude as illustrated in FIG. 1. Lock ring 74 keeps the O-ring 59 seated in groove 71 as the structure 14 is depressed into the housing chamber 42. Thus, the slidability of the relief valve structure 14 relative to the solenoid's housing 41 also permits the structure to function as a manual reset device.

In summary, the relief valve structure 14 of this invention is a unitary structure which provides three different functions, namely, it acts as a relief valve to relieve excess oil pressure when developed inside the solenoid's housing 22, it acts as a bumper for the plunger 13 as same is moved to the away position, and it acts as a manual reset device by which the plunger 13 can be moved manually to home position if desired.

Having described the preferred embodiment of my invention what I desire to claim and protect by Letters Patent is:

1. An oil bath solenoid comprising,
   a closed and sealed housing including sealingly connected base and cover portions,
   an electrical solenoid disposed in this housing and including an axially reciprocable plunger movable between two positions, said base portion being provided with an aperture therethrough and an actuating pin extending through the aperture and abutting the plunger internally of the housing so as to be shifted by reciprocable movement of the plunger, an oil bath fluid filling the housing and enveloping the solenoid and plunger, a manual reset actuator slidably mounted in said housing and operable when manually pushed inwardly to move said plunger from one of its two positions to the other position, and a pressure relief valve mounted within said manual reset actuator and operable to relieve fluid pressure internally of said housing in the event that it exceeds the pressure setting of said valve.

2. The oil bath solenoid of claim 1 in which said actuator is mounted in said housing in axial alignment with said plunger.

3. The oil bath solenoid of claim 2 in which said reset actuator has a resilient bumper secured thereto internally of the housing and engageable with said plunger when said reset button is manually pushed inwardly to reset the plunger.

4. The oil bath solenoid of claim 3 in which said resilient bumper is so positioned as to act as a physical stop for said plunger in one of its two positions.

5. The oil bath solenoid of claim 1 in which said pressure relief valve comprises a ball check valve spring biased to a closed position.

6. The oil bath solenoid of claim 5 in which said manual reset actuator includes a cup-shaped element, the closed end of which is located externally of said housing and the open end of which is located within said housing.

7. An oil bath solenoid having a relief valve structure comprising a plunger adapted to reciprocate between a home position and an away position, a wire coil which, when electrically energized, is adapted to move said plunger to one of said home or away positions, a housing surrounding said plunger and said coil, said housing being provided with an oil bath therein, and relief valve structure mounted in a wall of said housing, said relief valve structure including a check valve through which oil can be exhausted from the interior of said housing, and a cup within which said check valve is carried, said cup being slidably carried in said housing wall such that said cup may be manually depressed into the housing's chamber and engaged with said plunger to move said plunger toward the home position.

8. A device as set forth in claim 7 wherein said check valve includes a spring seated against the bottom of said cup a ball seated on the other end of said spring, a sealing ring mounted in said cup to provide the valve seat for said ball, and a vent port in the bottom of said cup.

9. A device as set forth in claim 7 including a bumper flange integral with the lip of said cup, said plunger abutting said bumper flange when said plunger is moved toward the away position.

10. A device as set forth in claim 9 including a tubular wall extending inwardly from said housing wall into the housing's chamber, said cup being slidably carried in said tubular wall, and at least a portion of said bumper flange being supported on its underside by the lip of said tubular wall.

11. A device as set forth in claim 10, wherein the length of said cup is at least as great as the distance between the bumper face of said bumper flange and the closest face of said plunger.

12. An oil bath solenoid having a relief valve structure comprising a plunger adapted to reciprocate between a home position and an away position, a wire coil which, when electrically energized, is adapted to move said plunger to one of said home or away position, a housing surrounding said plunger and said coil, said housing being provided with an oil bath therein, and relief valve structure mounted in a wall of said housing, said relief valve structure including a check valve through which oil can be exhausted from the interior of said housing, and a bumper flange integral with said relief valve structure, said plunger abutting said bumper flange when same is moved toward the away position.

13. A device as set forth in claim 12 including a cup within which said check valve is carried, said cup being slidably carried in said housing wall such that said cup may be manually depressed into the housing's chamber and engaged with said plunger to move said plunger toward the home position, and said bumper flange being integral with the lip of said cup.

14. A device as set forth in claim 13 including a tubular wall extending inwardly from said housing wall into the housing's chamber, said cup being slidably carried in said tubular wall, and at least a portion of said bumper flange being supported on its underside by the lip of said tubular wall.

15. A device as set forth in claim 14, wherein the length of said cup is at least as great as the distance between the bumper face of said bumper flange and the closest face of said plunger.

* * * * *